United States Patent [19]
Fujishima

[11] Patent Number: 5,532,541
[45] Date of Patent: Jul. 2, 1996

[54] ULTRASONIC MOTOR

[75] Inventor: Satoru Fujishima, Nagaokakyo, Japan

[73] Assignee: Murata Manufacturing Co., Ltd., Japan

[21] Appl. No.: 315,144

[22] Filed: Sep. 29, 1994

[30]     Foreign Application Priority Data

Sep. 30, 1993  [JP]  Japan .................................. 5-244066

[51] Int. Cl.$^6$ ............................................. H01L 41/08
[52] U.S. Cl. .......................................... 310/325; 310/323
[58] Field of Search ................................. 310/323, 328, 310/325

[56]                References Cited

U.S. PATENT DOCUMENTS

| | | | |
|---|---|---|---|
| 4,645,964 | 2/1987 | Hiramatsu et al. | 310/323 |
| 5,231,325 | 7/1993 | Tamai et al. | 310/323 |
| 5,410,204 | 4/1995 | Imabayashi et al. | 310/323 |

FOREIGN PATENT DOCUMENTS

| | | | |
|---|---|---|---|
| 590373 | 9/1993 | European Pat. Off. . | |
| 0229679 | 11/1985 | Japan | 310/323 |
| 0127983 | 9/1988 | Japan | 310/325 |
| 0041672 | 2/1990 | Japan | 310/325 |
| 3289367 | 12/1991 | Japan | 310/323 |

*Primary Examiner*—Mark O. Budd
*Attorney, Agent, or Firm*—Ostrolenk, Faber, Gerb & Soffen

[57]            ABSTRACT

An ultrasonic motor has a plurality of Langevin vibrators arranged in a ring, and the Langevin vibrators vibrate when an alternating voltage is provided thereto. Each of the Langevin vibrators has a first polarized region and a second polarized region which are polarized in mutually opposite directions. When the Langevin vibrators are supplied with an alternating voltage so as to vibrate in the length mode and flexural mode at substantially the same frequency, the edges of the metal terminals move in a elliptical motion, which drives the rotor.

19 Claims, 4 Drawing Sheets

ULTRASONIC MOTOR

BACKGROUND OF THE INVENTION

1. Field of the Invention

The present invention relates to an ultrasonic motor which is used as a driving source of a machine such as a car.

2. Description of Related Art

A conventional ultrasonic motor has Langevin vibrators as shown by FIG. 8, and the Langevin vibrators are set such that their vibration rods 61 are slanted respect to a rotor 62. The vibration rod 61 of each Langevin vibrator 60 reciprocates in a direction of the axis of the vibrator 60, and because of the slanted arrangement, the tip of the vibration rod 61 moves in an elliptical motion. The elliptical motion of the vibration rods 61 drives the rotor 62 in one direction. In this method, however, there is a problem that the vibration rods 61 fatigue easily and have a short useful life.

In order to solve the problem, a traveling wave type ultrasonic motor 70 as shown by FIG. 9 has been suggested. The ultrasonic motor 70 has a ring stator 71, and on a lower surface of the ring stator 71, a plurality of piezoelectric ceramic plates 72 are arranged such that adjacent plates 72 will have mutually opposite polarization directions. Then, on an upper surface of the ring stator 71, a rotor 73 is provided. When the ultrasonic motor 70 is provided with two alternating voltages which have a phase difference of 90 degrees, the piezoelectric ceramic plates 72 vibrate in a shear mode, which excites a traveling flexural wave on the upper surface of the ring stator 71. Then, the rotor 73 is driven in one direction by the ring stator 71. The ring stator 71 and the rotor 73 are entirely in contact with each other, and therefore they do not get fatigued easily. In this method, however, since the shear vibration of the piezoelectric ceramic plates 72 is used, the efficiency is not good, and it is difficult to produce an ultrasonic motor with a large output.

SUMMARY OF THE INVENTION

At least one object of at least one of the preferred embodiments of the present invention is to provide an ultrasonic motor which has a large output, a high efficiency and a long life.

In order to attain the at least one object, an ultrasonic motor according to at least one preferred embodiment of the present invention preferably comprises: a plurality of Langevin vibrators, each of which has a piezoelectric ceramic plate and a metal terminal joined together, the Langevin vibrators being adapted to vibrate when they are provided with an alternating voltage; and a rotor which is adapted to be driven by the vibration of the Langevin vibrators via friction with the Langevin vibrators. Each of the piezoelectric ceramic plates has a first polarized region and a second polarized region which are polarized in mutually opposite directions.

When the Langevin vibrators are provided with an alternating voltage so as to vibrate in a length mode and in a flexural mode at substantially the same frequency, the edges of the metal terminals move in an elliptical motion, which drives the rotor to rotate. The rotor is in contact with the Langevin vibrators arranged in a ring, that is, the rotor almost entirely is in contact with the Langevin vibrators, and therefore, both the rotor and the Langevin vibrators do not get fatigued easily.

BRIEF DESCRIPTION OF THE DRAWINGS

This and other objects and features of the preferred embodiments of the present invention will be apparent from the following description with reference to the accompanying drawings, in which.

DETAILED DESCRIPTION OF THE PREFERRED EMBODIMENTS

A preferred embodiment of the present invention is described with reference to the accompanying drawings.

Figure 1:
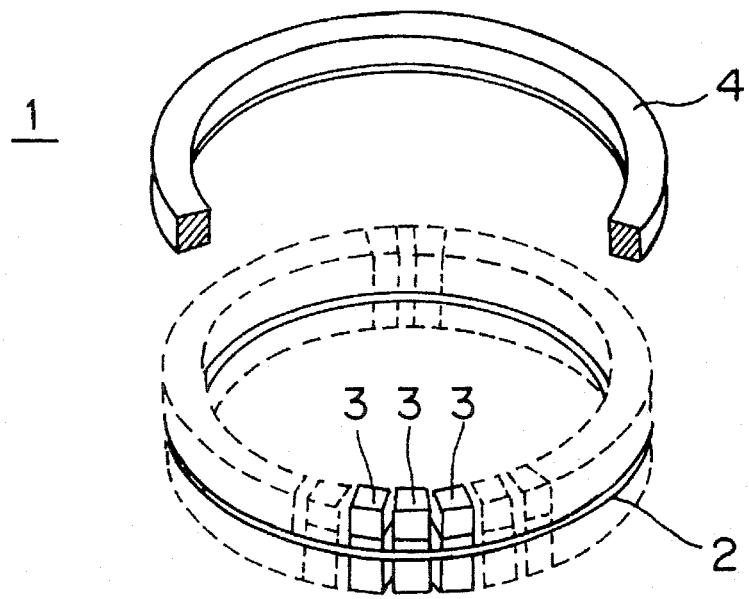
FIG. 1 is an explosive perspective view of an ultrasonic motor according to a preferred embodiment of the present invention.

As shown in FIG. 1, an ultrasonic motor 1 comprises a metal ring stator 2, Langevin vibrators 3 and a rotor 4. The Langevin vibrators 3, which are rectangular, are arranged in a circle on the ring stator 2.

Figure 2:
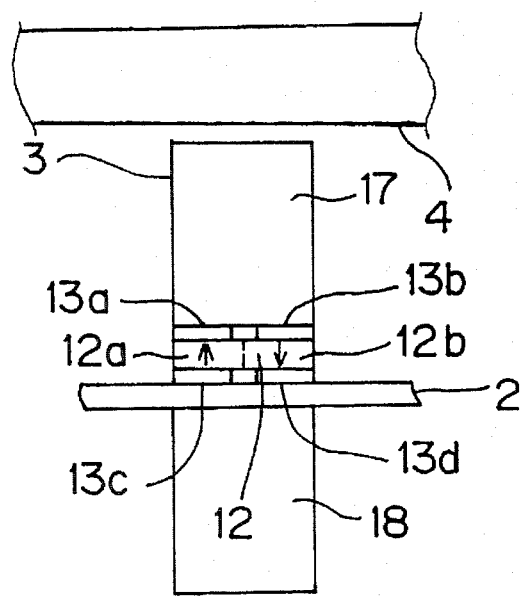
FIG. 2 is a front view of a Langevin vibrator employed in the ultrasonic motor shown by FIG. 1.

Each of the Langevin vibrators 3, as shown in FIG. 2, comprises a piezoelectric ceramic plate 12 which is mounted on an upper surface of the ring stator 2, a metal terminal 17 joined to the piezoelectric ceramic plate 12 and a metal terminal 18 mounted on a lower surface of the ring stator 2. The piezoelectric ceramic plate 12, and the metal terminals 17 and 18 have shapes and sizes which cause the Langevin vibrator 3 to vibrate in a length mode and in a flexural mode at substantially the same frequency.

The piezoelectric ceramic plate 12 has electrodes 13a and 13b on the upper surface and electrodes 13c and 13d on the lower surface. The electrodes 13a and 13b, and the electrodes 13c and 13d on the respective surfaces are separated from each other in the center by a separation line. The electrodes 13a and 13c, which are disposed opposite to each other, are provided with a direct voltage, and thereby, the left half 12a of the piezoelectric ceramic plate 12 is polarized as indicated with the upward directing arrow. Likewise, the electrodes 13b and 13d, which are disposed opposite to each other, are provided with a direct voltage, and thereby, the right half 12b of the piezoelectric ceramic plate 12 is polarized as indicated with the downward directing arrow. Thus, the left half 12a and the right half 12b of the piezoelectric ceramic plate 12 are polarized to have directions of polarization which are different from each other by 180 degrees. The separation line which separates the electrodes 13a and 13b (or 13c and 13d) from each other extends in a direction perpendicular to the direction of the circumference of the ring stator 2. Langevin vibrators 3 of this structure are arranged on the ring stator 2 such that each of the Langevin vibrators 3 will make elliptical vibration with the same phase.

The rotor 4, which is provided with a moderate pressure by pressing means (not shown), is in contact with the edge of the terminal 17 of the Langevin vibrator 3. The rotor 4 is made of preferably a metal and is shaped into a ring. The rotor 4 is preferably improved in the abrasion resistance by providing ring sheets made of an anti-abrasion material or by coating the anti-abrasion material on the upper surface and the lower surface.

Figure 3:
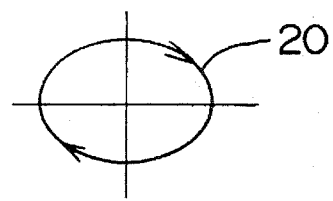
FIGS. 3 and 4 are graphs showing elliptical motion of edges of metal terminals.
Figure 4:
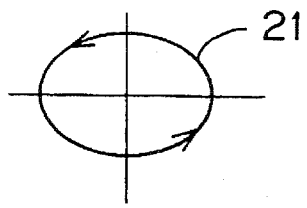

The ultrasonic motor 1 of the above structure is provided with an alternating voltage, and each of the edges of the metal terminals 17 and 18 makes elliptical vibration as indicated with curves 20 and 21 in FIGS. 3 and 4. In the graphs of FIGS. 3 and 4, the x-axis denotes the amplitude of the flexural vibration of the Langevin vibrators 3, and the y-axis denotes the amplitude of the length vibration. Each Langevin vibrator 3 vibrates in a length mode and in a flexural mode at substantially the same frequency, and the length vibration and the flexural vibration are combined to cause elliptical vibration. With the elliptical vibration of the edges of the metal terminals 17 and 18, the rotor 4, which is in contact with the metal terminals 17 with a moderate pressure, rotates in one direction. When the supply of the alternating voltage is stopped, the rotor 4 stops rotating because of the pressure and the friction between the vibrators 3 and the rotor 4. When the vibrators 3 are provided with an alternating voltage with the opposite phase, the rotor 4 rotates in the opposite direction.

Since the rotor 4 is almost entirely in contact with the Langevin vibrators 3, both the rotor 4 and the vibrators 3 do not get fatigued easily, and consequently, the ultrasonic motor 1 has a long useful life. An ultrasonic motor with a large output can be obtained easily by providing more vibrators 3. Further, the ultrasonic motor 1 operates in an elliptical vibration mode and thereby has a higher efficiency than a conventional ultrasonic motor which operates in a shear vibration mode. Moreover, the ultrasonic motor 1 is driven at a single frequency and requires a simple driving circuit.

Figure 5:
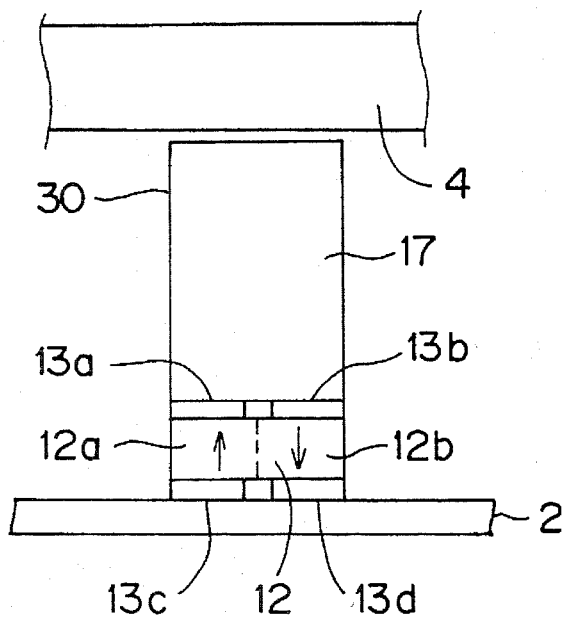
FIG. 5 is a front view of a preferred modification of the Langevin vibrator.

In the above preferred embodiment, the Langevin vibrators 3 preferably have two metal terminals 17 and 18. However, as shown in FIG. 5, Langevin vibrators 30 which have a single metal terminal 17 can also be used.

Figure 6:
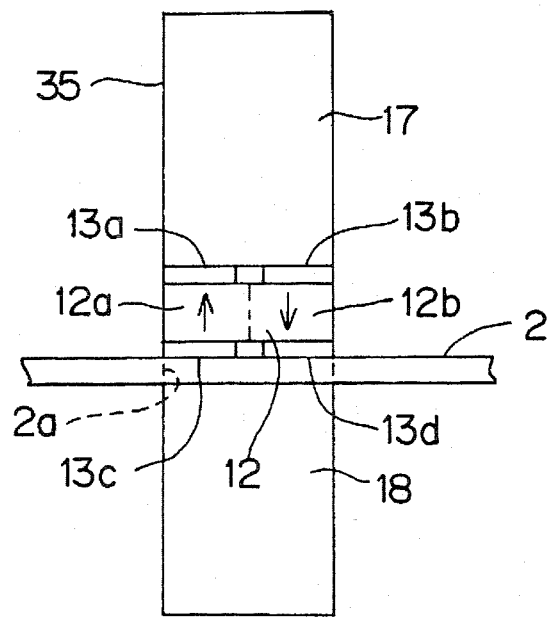
FIG. 6 is a front view of a Langevin vibrator and a way of fitting the Langevin vibrator to a ring stator.

FIG. 6 shows a way of fitting a Langevin vibrator to the ring stator 2. The ring stator 2 has fitting holes 2a, and a Langevin vibrator 35 is inserted in one of the holes 2a. The Langevin vibrator 35 preferably has a piezoelectric ceramic plate 12 with electrodes 13a through 13d on the upper and lower surfaces, and metal terminals 17 and 18. After insertion of the Langevin vibrator 35, the sides of the metal terminal 18 near the node are bonded to the ring stator 2.

Figure 7:
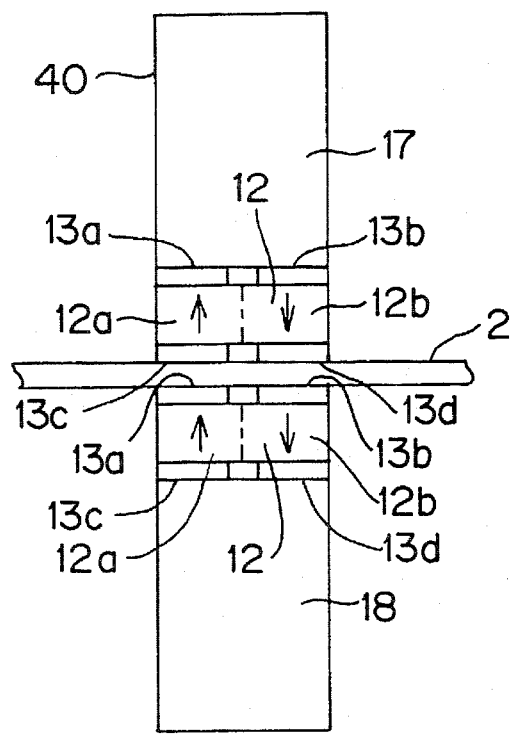
FIG. 7 is a front view of another Langevin vibrator and a way of fitting the Langevin vibrator to the ring stator.
Figure 8:
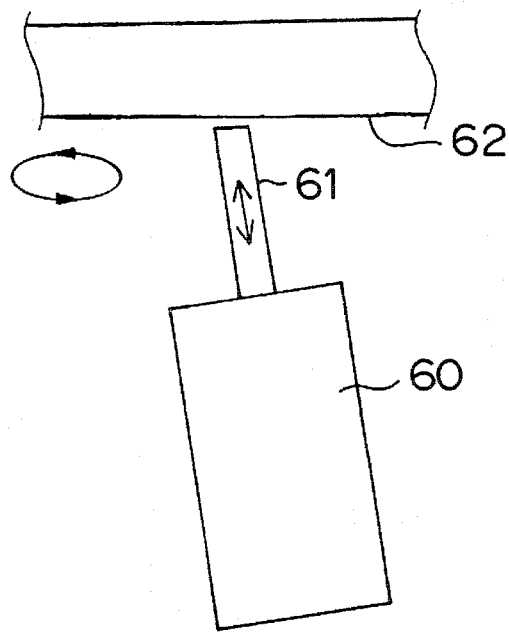
FIG. 8 is a front view of a Langevin vibrator and a rotor of a conventional ultrasonic motor.
Figure 9:
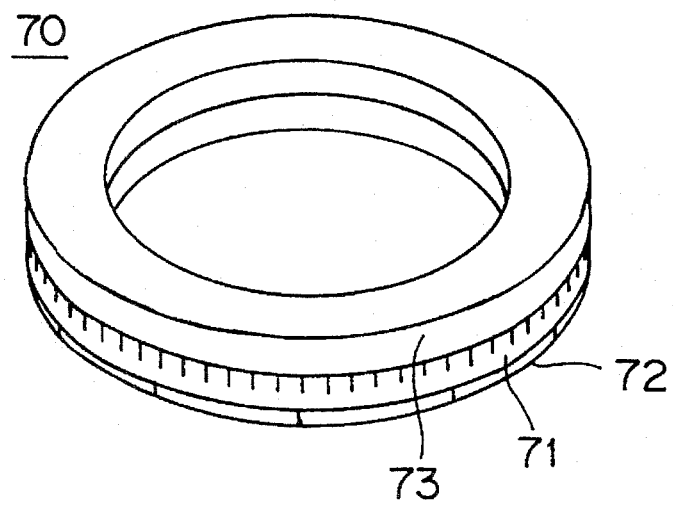
FIG. 9 is a perspective view of another conventional ultrasonic motor.

FIG. 7 shows another way of fitting a Langevin vibrator to the ring stator 2. The ring stator 2, on both the upper surface and the lower surface, is stuck with piezoelectric ceramic plates 12 with the electrodes 13a through 13d, and the metal terminals 17 and 18 are joined to the piezoelectric ceramic plates 12, respectively. Thus, a Langevin vibrator 40 with two piezoelectric ceramic plates 12 is fitted to the ring stator 2. In this case, the ring stator 2 is grounded, and the metal terminals 17 and 18 are provided with alternating voltages which have mutually opposite phases. When one of the piezoelectric ceramic plates 12 is bonded to the ring stator 2 upside down, the metal terminals 17 and 18 are grounded, and the ring stator 2 is provided with an alternating voltage.

Although the rotor 4 is in contact with the metal terminals 17 in the preferred embodiment, the rotor 4 can be set so as to be in contact with the metal terminals 18. When the rotor 4 is set so as to be in contact with the metal terminals 18, the rotor 4 rotates in the opposite direction. Also, the ultrasonic motor can be provided with two rotors 4 which are in contact with the metal terminals 17 and 18, respectively. In this case, the motor obtains twice the amount of torque. However, in order to rotate the two rotors 4 in the same direction, the elliptical motion of the terminals 17 and that of the terminals 18 must have opposite phases.

Further, if necessary, the electrodes 13a, 13b, 13c and 13d are removed from the piezoelectric ceramic plates 12 by mechanical means or chemical means after the polarizing process of the piezoelectric ceramic plates 12. In this case, if an adhesive whose main constituent is an insulating material is used to join the piezoelectric ceramic plates 12 and the metal terminals 17 and 18, the adhesive will act as a capacitor, which will lower the piezoelectric characteristics. Therefore, it is preferred that an adhesive whose main constituent is a conductive material is used.

Although the present invention has been described in connection with the preferred embodiments, it is to be noted that various changes and modifications are possible to those who are skilled in the art. Such changes and modifications are to be understood as being within the scope of the present invention.

What is claimed is:

1. An ultrasonic motor comprising:
   a plurality of Langevin vibrators, each of which comprises a piezoelectric ceramic plate and at least one metal terminal joined together, the Langevin vibrators being adapted and arranged to vibrate in a length mode and in a flexural mode thereby producing an elliptical vibration of edge portions of the metal terminals when the Langevin vibrators are supplied with an alternating voltage;
   a rotor being arranged to be driven by vibration of the Langevin vibrators via friction with the Langevin vibrators; and
   a ring stator having at least one supporting surface for supporting the Langevin vibrators; wherein
      each of the piezoelectric ceramic plates has a first polarized region and a second polarized region which are polarized in mutually opposite directions;
      the plurality of Langevin vibrators being arranged adjacent to each other on the at least one supporting surface of the stator so as to form a ring and so that the first polarized region of each of the Langevin vibrators is disposed adjacent to the second polarized region of an adjacent one of the Langevin vibrators.

2. An ultrasonic motor as claimed in claim 1, wherein each of the Langevin vibrators is adapted and arranged to vibrate in the length mode and in the flexural mode at a frequency that is substantially equal to a vibrating frequency of each of the other Langevin vibrators.

3. An ultrasonic motor as claimed in claim 1, wherein the Langevin vibrators are arranged on the ring stator such that the first polarized regions and the second polarized regions of the piezoelectric ceramic plates are disposed so as to alternate along the supporting surface of the ring stator.

4. An ultrasonic motor as claimed in claim 1, wherein each of the Langevin vibrators is inserted in a hole made in the ring stator and fixed to the ring stator at sides of the metal terminal near a node.

5. An ultrasonic motor comprising:
   a plurality of Langevin vibrators, each of which comprises a piezoelectric ceramic plate and at least one metal terminal joined together, the Langevin vibrators being adapted and arranged to vibrate in a length mode and in a flexural mode thereby producing an elliptical vibration of edge portions of the metal terminals when the Langevin vibrators are supplied with an alternating voltage;

a ring stator having a first surface and a second surface for supporting the Langevin vibrators;

a first rotor being arranged to be driven by vibration of the Langevin vibrators arranged on the first surface of the ring stator via friction with the Langevin vibrators; and a second rotor which is driven by vibration of the Langevin vibrators arranged on the second surface of the ring stator via friction with the Langevin vibrators; wherein each of the piezoelectric ceramic plates has a first polarized region and a second polarized region which are polarized in mutually opposite directions;

the plurality of Langevin vibrators being arranged adjacent to each other on the first and second surfaces of the stator so as to form a ring and so that the first polarized region of each of the Langevin vibrators is disposed adjacent to the second polarized region of an adjacent one of the Langevin vibrators.

6. An ultrasonic motor as claimed in claim 5, wherein each of the Langevin vibrators is adapted and arranged to vibrate in the length mode and in the flexural mode at a frequency that is substantially equal to a vibrating frequency of each of the other Langevin vibrators.

7. An ultrasonic motor comprising:

a plurality of Langevin vibrators, each of which comprises a piezoelectric ceramic plate and a metal terminal joined together, the Langevin vibrators being adapted and arranged to vibrate in a length mode and in a flexural mode thereby producing an elliptical vibration of edge portions of the metal terminals when the Langevin vibrators are supplied with an alternating voltage such that the elliptical vibration of each of the edge portions of the metal terminals are substantially in phase with each other;

a rotor being arranged to be driven by vibration of the Langevin vibrators via friction with the Langevin vibrators; and a ring stator having at least one supporting surface for supporting the Langevin vibrators arranged adjacent to each other on the supporting surface so as to form a ring; wherein each of the piezoelectric ceramic plates has a first polarized region and a second polarized region which are polarized in mutually opposite directions and the Langevin vibrators are arranged on the ring stator such that the first polarized region of each Langevin vibrator is disposed adjacent to the second polarized region of an adjacent one of the Langevin vibrators.

8. An ultrasonic motor as claimed in claim 1, further comprising a first pair of electrodes and a second pair of electrodes provided on each of the piezoelectric ceramic plates, the first and second pair of electrodes being arranged and adapted to polarize the first and second polarized regions in response to receiving a direct voltage.

9. An ultrasonic motor as claimed in claim 8, wherein the first pair of electrodes are separated from the second pair of electrodes by a separation line extending in a direction that is substantially perpendicular to the at least one supporting surface of the ring stator.

10. An ultrasonic motor as claimed in claim 1, wherein the Langevin vibrators are adapted and arranged to vibrate in the flexural mode and the length mode such that the elliptical vibration of each of the edge portions of the metal terminals are substantially in phase with each other.

11. An ultrasonic motor as claimed in claim 1, wherein each of the Langevin vibrators are arranged and adapted to vibrate so as to drive the ultrasonic motor at a single frequency.

12. An ultrasonic motor as claimed in claim 1, wherein the rotor is in contact with the edge portions of the metal terminals.

13. An ultrasonic motor as claimed in claim 5, wherein the Langevin vibrators are adapted and arranged to vibrate in the flexural mode and the length mode such that the elliptical vibration of each of the edge portions of the metal terminals are substantially in phase with each other.

14. An ultrasonic motor as claimed in claim 5, wherein each of the Langevin vibrators are arranged and adapted to vibrate so as to drive the ultrasonic motor at a single frequency.

15. An ultrasonic motor as claimed in claim 5, wherein the rotor is in contact with the edge portions of the metal terminals.

16. An ultrasonic motor as claimed in claim 7, wherein each of the Langevin vibrators is adapted and arranged to vibrate in the length mode and in the flexural mode at a frequency that is substantially equal to a vibrating frequency of each of the other Langevin vibrators.

17. An ultrasonic motor as claimed in claim 7, wherein each of the piezoelectric ceramic plates includes a first pair of electrodes and a second pair of electrodes;

each of the first pair of electrodes being arranged and adapted to form a first polarized region in a respective piezoelectric ceramic plate when the first pair of electrodes are supplied with a first direct voltage; and each of the second pair of electrodes being arranged and adapted to form a second polarized region in a respective piezoelectric ceramic plate when the second pair of electrodes are supplied with a second direct voltage, the second polarized region being polarized in a direction opposite to a polarization direction of the first polarized region.

18. An ultrasonic motor as claimed in claim 17, wherein the first direct voltage is opposite in phase to the second direct voltage.

19. An ultrasonic motor as claimed in claim 7, wherein the rotor is in contact with the edge portions of the metal terminals.

\* \* \* \* \*